United States Patent Office 3,545,320
Patented Dec. 8, 1970

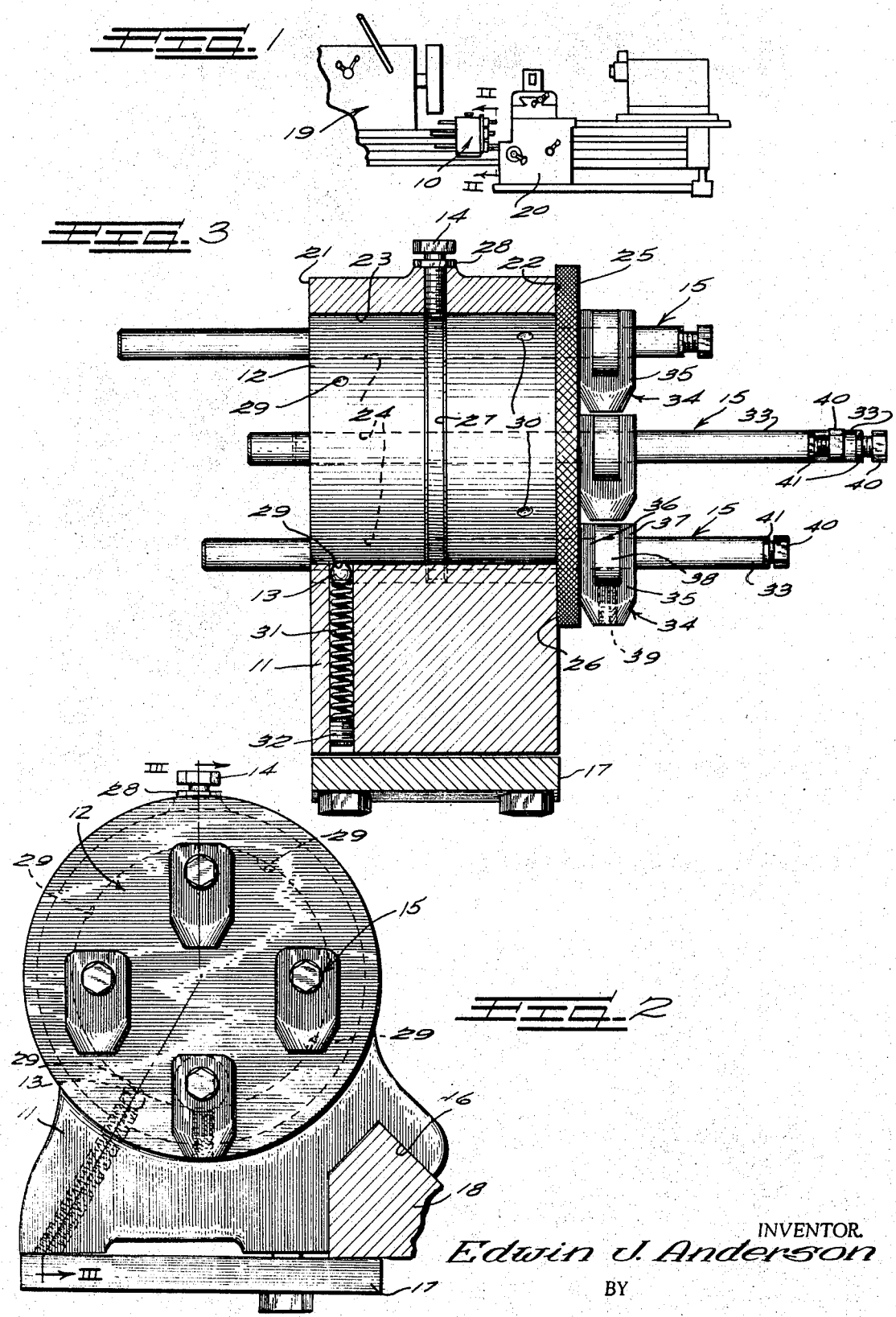

3,545,320
LATHE CARRIAGE STOP
Edwin J. Anderson, 102 N. 4th St., Aurora, Ill. 60505
Filed June 20, 1968, Ser. No. 738,498
Int. Cl. B23b 3/36
U.S. Cl. 82—34   6 Claims

ABSTRACT OF THE DISCLOSURE

A lathe carriage stop includes a housing, a block rotatably and reversibly supported therein at predetermined angular positions, and a series of stop rods of adjustable effective length carried by the block and slidably removable therefrom without disturbing said effective length.

---

This invention relates generally to a carriage stop for an engine lathe, and more specifically to such a device having several improvements incorporated therein.

Although the principles of the present invention may be included in various lathe stops, a particularly useful application is made in a lathe stop of the roll type. Lathe stops have been provided previously. However, certain disadvantages have been present in prior known devices. By way of example, it has been customary to provide special structure on either the lathe carriage, or on a stationary portion of the lathe, such as the bed, to support a carriage stop or to cooperate with the same. Accordingly, it is an object of the present invention to provide a lathe carriage stop which may be secured to existing lathes without any further modification thereof or addition thereto.

Heretofore, lathe carriage stops have been so constructed that the stop arrests carriage movement only in one direction, such as toward the headstock. At times, it is necessary to arrest lathe carriage movement in the opposite direction. Accordingly, it is a further object of the present invention to provide a lathe carriage stop which is so constructed that it may be employed to arrest lathe carriage movement in either direction.

Also heretofore, lathe carriage stops have been provided with a number of stop rods, limited in number to that which is built into the device initially. Accordingly, a still further object of the present invention is to provide a lathe carriage stop so constructed that an unlimited number of stop rods may be employed therewith without disturbing any preselected setting thereof.

Many other advantages, features and additional objects of the present invention will become manifest to those versed in the art upon making reference to the detailed description and the accompanying sheet of drawings in which a preferred structural embodiment incorporating the principles of the present invention is shown by way of illustrative example.

On the drawings:

FIG. 1 is a fragmentary diagrammatic view of an engine lathe provided with a lathe carriage stop constructed in accordance with the principles of the present invention;

FIG. 2 is an enlarged fragmentary cross-sectional view taken along line II—II of FIG. 1; and FIG. 3 is a cross-sectional view taken along line III—III of FIG. 2.

As shown on the drawings:

The principles of this invention are particularly useful when embodied in a lathe carriage stop assembly such as illustrated in FIG. 1, generally indicated by the numeral 10.

Referring to FIG. 3, the lathe carriage stop 10 includes a housing 11, a block 12, a spring loaded member 13, a retractable block retainer 14, and a plurality of stop rods, each generally indicated at 15.

The housing 11, as best seen in FIG. 2, is provided with a transverse groove 16 which is directed toward a clamp plate 17. The means defining the groove 16 and the clamp plate 17 coact as a clamp on one of the ways 18 of a lathe generally indicated at 19 in FIG. 1. In a preferred embodiment, the way 18 is a stationary part of the bed of the lathe 19 and also serves to support a conventional carriage 20. In FIG. 1, the lathe carriage stop 10 is illustrated as being clamped to the lathe 19 at a posiion to the left of the carriage 20. As is brought out more fully below, the lathe carriage stop 10 may also be clamped to the lathe at the right side of the carriage 20 for coaction therewith.

Referring again to FIG. 3, the housing 11 has a pair of oppositely directed external flat faces 21, 22 which are parallel to each other and which are intersected by a cylindrical opening 23, the axis of which is perpendicular to the faces 21, 22.

The block 12 is formed in the nature of a cylinder and has an external diameter which is slidably received within the opening 23. Thus the block 12 is rotatably supported by the housing 11, and has a rotational axis coinciding with the axis of the opening 23. The block 12 is provided with a plurality of apertures 24, each of which is parallel to and radially offset from the rotational axis of the block 12. The axis of each of the apertures 24, when the lathe carriage stop 10 is clamped to the lathe 19, is parallel to the direction of movement of the lathe carriage 20.

The block 12 has a flange 25 disposed at one end thereof, the outer surface of which is knurled and which projects from the housing radially to facilitate grasping and rotation thereof. The flange 25 extends radially from the cylindrical opening 23, and has a face 26 illustrated as being in engagement with the housing face 22. The block 12 may be withdrawn from the cylindrical opening 23 and reinserted from the other side of the housing 11, thereby placing the flange face 26 in direct engagement with the housing face 21.

The block 12 has means 27 which defines a peripheral circumferential groove, such groove defining means 27 being situated so that the groove is disposed midway between the housing faces 21 and 22. Received within the groove 27 is the retractable block retainer 14, here compromising a screw having a suitably shaped tip which coacts with the means 27 to preclude any substantial axial movement of the block 12 but to enable rotation thereof. Preferably, a locking nut 28 is also provided on the block retainer screw 14 as shown. Thus the screw 14 will coact with the groove 27 when the block 12 is inserted or received through either of the faces 21 and 22 of the housing.

The block 12 is provided with a set of four circumferentially aligned dimples 29, and a second set of such dimples 30 axially spaced therefrom. The spring loaded member 13 comprises a steel ball which is loaded by a compression spring 31 held in position by adjustable plug 32. The ball 13 is received in the dimples 29 successively in response to rotation of the block 12 when the flange 25 engages the housing face 22. The ball 13 is similarly successively received in the dimples 30 when the housing flanges 25 engages the housing face 21. As best seen in FIG. 2, the dimples do not coincide with the position of the stop rods 15, and therefore the set of dimples 29 is angularly offset with respect to the dimples 30 a corresponding amount.

Each of the stop rods 15 is so constructed as to be of adjustable effective length. To this end, each of the assemblies 15 comprises a rod 33 which has a diameter slightly less than that of the apertures 24 so as to be slidably receivable therein. The stop rod assemblies 15 further include a stop assembly 34, each of which comprises a yoke 35 having a pair of legs 36, 37 between which there is received an apertured ring 38. The legs 36 and 37 are apertured in alignment with the aperture of the ring 38 and the rod 33 is freely slidably received through such apertures. The yoke 35 has a set screw 39 which thus acts between the yoke 35 and the ring 38 to cause the ring 38 to apply a shearing force with respect to the legs 36, 37 to the rod 33. The clampable yoke assembly 34 thus comprises a coarse adjustment for the effective length of the stop rod 15.

That end of each of the rods 33 which projects from the stop assembly 34 in a direction away from the flange 25 is that part of the stop rod 15 which projects toward the lathe carriage 20 to be engaged thereby. Since the individual stop assemblies 34 are clamped to the rods 33 intermediate the ends thereof, upon application of a force by the carriage 20 to the adjacent end of the rod 33, the corresponding stop assembly will abut or react or engage the adjacent end face of the block 12 to preclude further lathe movement toward the lathe carriage stop 10.

Because of the construction employed, the individual stop rods 15 may be slidably and selectively removed and replaced with other similar stop rods 15 having other preselected effective lengths. It is noteworthy that in the removal and replacement of any of the stop rods 15, the setting or adjustment thereof is not in any way disturbed.

In the preferred embodiment, each rod 33 s also provided with means for adjusting the distance between the stop assembly 34 and the carriage engaging end thereof. Such adjustment comprises a fine adjustment of the effective length, and also is not disturbed during removal and replacement of a stop rod assembly 15. A particularly facile manner of providing this further fine adjustment means is illustrated as comprising a screw having a hardened head 40 threadably received into the end of the rod 33 and locked in the desired preset position by a locking nut 41.

By the foregoing construction, a lathe carriage stop is provided which may be selectively clamped to the lathe at either side of the carriage 20 to arrest the movement thereof in an unlimited number of preselected positions, the number being unlimited since the individual stop rods or stop rod assemblies 15 may be slidably removed and replaced manually without disturbing the pre-adjusted effective length thereof.

Although various minor modifications might be suggested by those versed in the art, it should be understood that I wish to embody within the scope of the patent warranted hereon, all such embodiments as reasonably and properly come within the scope of my contribution to the art.

I claim as my invention:

1. A carriage stop for a lathe, comprising:
  (a) a housing constructed to be secured to a selected portion of the lathe, said housing having a cylindrical opening extending therethrough between oppositely directed end faces of said housing, the axis of said opening being parallel to the direction of carriage movement;
  (b) a block supported by said housing in said opening for rotation about the axis of said opening, said block having a flange at only one end extending radially from said opening in engagement with one of said end faces, said block being slidably removably carried to enable said block to be reversed with said flange in engagement with the other of said end faces, said block having a plurality of apertures therethrough extending parallel to said axis and movable into alignment with the carriage;
  (c) a plurality of stop rods freely axially slidably received in said apertures from the flanged end of said block, said rods being respectively movable into a carriage-engaging-and-arresting position in response to being aligned therewith; and
  (d) each of said rods having a means for adjustably limiting the extent of the axial sliding thereof in its aperture.

2. A carriage stop according to claim 1, including:
  (a) means defining a peripheral groove extending circumferentially about said block midway between said housing faces; and
  (b) a retractable block retainer carried by said housing and operative on said groove-defining means when said flange engages either of said faces.

3. A carriage stop according to claim 1, including:
  (a) means defining two axially spaced sets of circumferentially aligned dimples on said block; and
  (b) a spring-loaded member successively receivable in the dimples of one of said sets when said flange engages one of said faces, and in the dimples of the other of said sets when said flange engages the other of said faces.

4. A carriage stop for a lathe, comprising:
  (a) a housing constructed to be secured to a selected portion of the lathe;
  (b) a block supported by said housing and having a plurality of apertures alignable in a direction parallel to that of carriage movement with the carriage;
  (c) a plurality of stop rods freely axially slidably received in said apertures, said rods being respectively movable into a carriage-engaging-and-arresting position in response to being aligned therewith;
  (d) said rods each having means enabling the adjustment of the effective length thereof, each said adjustment means including a stop assembly respectively movably secured to one of said rods at a selected position intermediate the ends thereof and engageable with one of the end faces of said block, each of said rods with its stop assembly being slidably removable as a unit from said block without disturbing the position of such stop assembly thereon.

5. A carriage stop according to claim 4, wherein each of said stop assemblies comprises a yoke assembly slidable on said rod and clampable thereon.

6. A carriage stop according to claim 4, wherein said adjustment means for said stop rods further includes means for finely adjusting the distance between each said stop assembly and the carriage-engaging end of each said rod without disturbing the position of said stop assembly thereon.

References Cited

UNITED STATES PATENTS

| 1,205,970 | 11/1916 | Burrell | 82—34 |
| 2,559,311 | 7/1951 | Meissner | 82—34 |

FOREIGN PATENTS

| 51,097 | 3/1922 | Sweden. | |

LEONIDAS VLACHOS, Primary Examiner